US009381875B2

(12) United States Patent
Takeda et al.

(10) Patent No.: US 9,381,875 B2
(45) Date of Patent: Jul. 5, 2016

(54) POWER SUPPLY CONTROL APPARATUS

(71) Applicant: DENSO CORPORATION, Kariya, Aichi-pref. (JP)

(72) Inventors: Toshihiko Takeda, Chiryu (JP); Akihiro Nakamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 367 days.

(21) Appl. No.: 14/155,512

(22) Filed: Jan. 15, 2014

(65) Prior Publication Data
US 2014/0292071 A1 Oct. 2, 2014

(30) Foreign Application Priority Data

Apr. 2, 2013 (JP) .................................. 2013-76977

(51) Int. Cl.
*B60L 1/00* (2006.01)
*B60R 16/02* (2006.01)
*H02M 3/156* (2006.01)
*H02M 1/00* (2006.01)

(52) U.S. Cl.
CPC ............... *B60R 16/02* (2013.01); *H02M 3/156* (2013.01); *H02M 2001/0003* (2013.01); *H02M 2001/0012* (2013.01); *H02M 2001/0022* (2013.01)

(58) Field of Classification Search
CPC .................. B60R 16/02; H02M 3/156; H02M 2001/0003; H02M 2001/0022; H02M 2001/0012
See application file for complete search history.

(56) References Cited

U.S. PATENT DOCUMENTS

| 2001/0048295 | A1 | 12/2001 | Joch | |
| 2005/0254273 | A1* | 11/2005 | Soudier | H02M 3/335 363/103 |
| 2009/0150694 | A1 | 6/2009 | Motomiya et al. | |
| 2010/0006360 | A1 | 1/2010 | Kishimoto | |
| 2013/0051084 | A1* | 2/2013 | Hachiya | H02M 3/33507 363/21.01 |
| 2014/0125120 | A1* | 5/2014 | Bang | B60L 11/18 307/9.1 |

FOREIGN PATENT DOCUMENTS

| JP | 2004-282835 A | 10/2004 |
| JP | 2010-213500 A | 9/2010 |
| JP | 2012-115031 A | 6/2012 |

OTHER PUBLICATIONS

Office Action mailed Jun. 2, 2015 in the corresponding JP application No. 2013-076977 (partial English translation attached).

* cited by examiner

*Primary Examiner* — Daniel Cavallari
(74) *Attorney, Agent, or Firm* — Posz Law Group, PLC

(57) ABSTRACT

A power supply control apparatus monitors a high voltage, an intermediate voltage and a low voltage and detects voltage variation amounts of those voltages. When an absolute value of the voltage variation amount is greater than a predetermined variation amount, the power supply control apparatus corrects the voltage of large variation by controlling a DC-DC converter based on the voltage variation amount. The power supply control apparatus further estimates voltage variation amounts of the voltages other than the voltage of large variation based on the voltage variation amount of large variation and corrects the voltage of estimated large variation by controlling the DC-DC converter based on the estimated voltage variation amount.

8 Claims, 2 Drawing Sheets

POWER SUPPLY CONTROL APPARATUS

CROSS REFERENCE TO RELATED APPLICATION

This application is based on and incorporates herein by reference Japanese patent application No. 2013-76977 filed on Apr. 2, 2013.

TECHNICAL FIELD

The present disclosure relates to a power supply control apparatus, which is provided for use in a vehicular power supply system having a high voltage power supply device and a low voltage power supply device. The power supply control apparatus charges the low voltage power supply device by lowering a high voltage of the high voltage power supply device and generates, as a power supply voltage, an intermediate voltage, which is between the high voltage and the low voltage, by converting at least one of the high voltage and the low voltage.

BACKGROUND ART

A hybrid vehicle conventionally is equipped with, for example, a high voltage power supply device and a low voltage power supply device. The high voltage power supply device is for supplying electric power to an electric motor or the like for driving a vehicle. The low voltage power supply device is for supplying electric power to an electronic control unit, an electric actuator or the like for controlling a vehicle. The low voltage power supply device is charged by lowering the high voltage of the high voltage power supply device by a DC-DC converter.

It is also conventional (for example, P-A-2012-115031) that a DC-DC converter is used to convert a high voltage of a high voltage power supply device or a low voltage of a low voltage power supply device to an intermediate voltage, which is between the high voltage and the low voltage, so that the intermediate voltage may also be used as a power supply voltage for a vehicle.

The high voltage, the intermediate voltage and the low voltage, which are power supply voltages for a vehicle, tend to vary with temperature, power consumption and the like. It is proposed to control a DC-DC converter and the like based on voltage variations of such voltages. Specifically, the high voltage is corrected based on a voltage variation amount of the high voltage, the intermediate voltage is corrected base on a voltage variation amount of the intermediate voltage and the low voltage is corrected based on a voltage variation amount of the low voltage.

However, since those voltages are related one another because of the voltage conversion operation by the DC-DC converter, it is difficult to set those voltages to respective target voltage values even if the voltages are corrected individually.

SUMMARY

It is therefore an object to provide a power supply control apparatus for controlling power supply voltages appropriately when at least one of a high voltage, an intermediate voltage and a low voltage, which are power supply voltages for a vehicle, varies.

According to one aspect, a power supply control apparatus is provided for a vehicular power supply system, which has a high voltage power supply device of a high voltage, a low voltage power supply device of a low voltage lower than the high voltage and a converter for power conversion, charges the low voltage power supply device by lowering the high voltage and generates an intermediate voltage between the high voltage and the low voltage by converting at least one of the high voltage and the low voltage by the converter. The power supply control apparatus comprises a variation amount acquisition section and a correction section.

The variation amount acquisition section acquires a voltage variation amount of at least one of the high voltage, the intermediate voltage and the low voltage. The correction section corrects a varying voltage, which is one of the high voltage, the intermediate voltage and the low voltage having an acquired voltage variation amount, and at least one of two voltages other than the varying voltage, by controlling the converter based on the voltage variation amount of the varying voltage.

EMBODIMENT

Power Supply Control System

Figure 1:
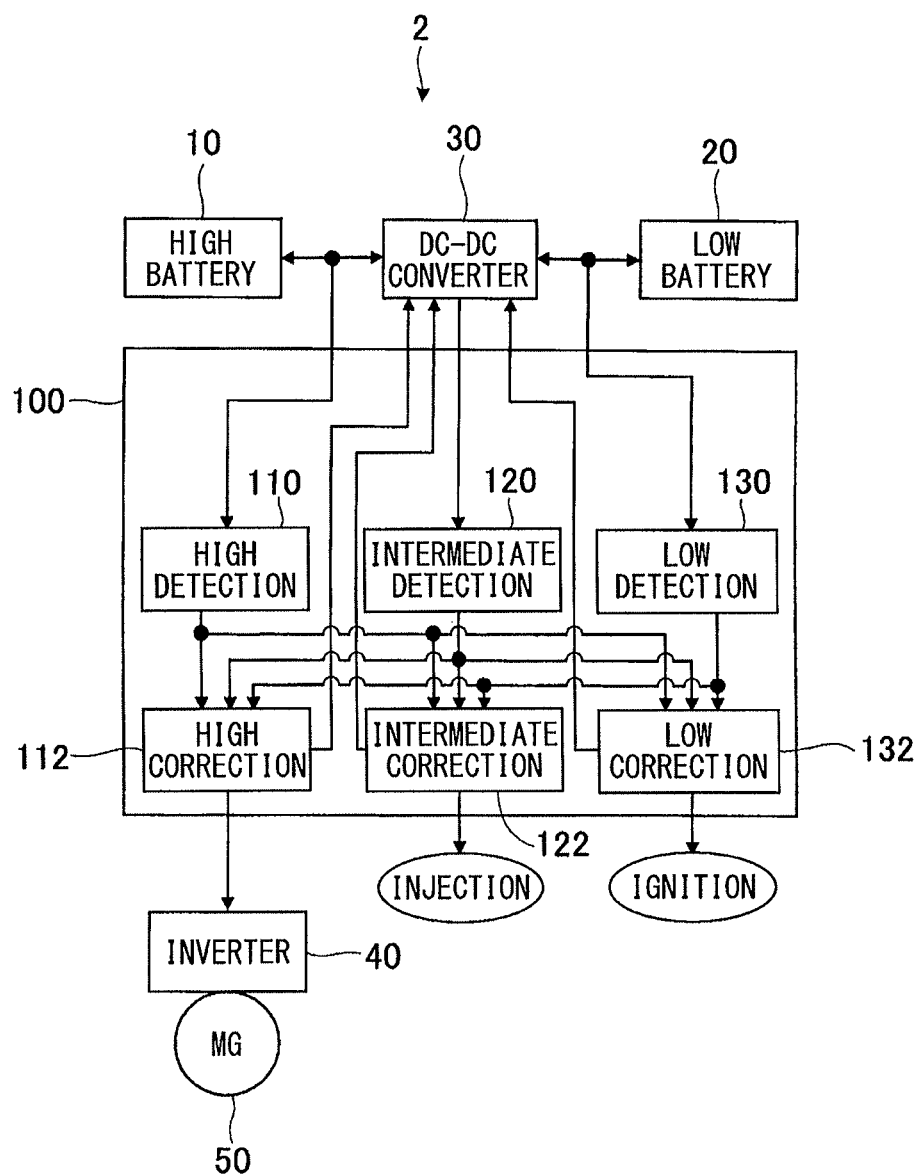
FIG. 1 is a block diagram showing a power supply control system, which uses a power control apparatus according to one embodiment.

A power supply control system 2, which uses a power supply control apparatus 100 according to one embodiment, is shown in FIG. 1. The power supply control system 2 is used in a hybrid vehicle, which is provided with, for example, an internal combustion engine (not shown) and a motor-generator (MG) 50 as a drive power source. The MG 50 operates as an electric motor for vehicle travel and an electric generator for power generation.

As power supply voltages for a vehicle, a high voltage of a high voltage battery 10, a low voltage of a low voltage battery 20 and an intermediate voltage are used. The intermediate voltage is between the high voltage and the low voltage, that is, lower than the high voltage and higher than the low voltage. For example, the high voltage is about 200V, the intermediate voltage is in a range between 40V and 50V and the low voltage is about 14V.

The intermediate voltage may be generated by converting either one of the high voltage of the high voltage battery 10 and the low voltage of the low voltage battery by a DC-DC converter 30, which is a voltage conversion device. The intermediate voltage may alternatively be generated by converting both of the high voltage of the high voltage battery 10 and the low voltage of the low voltage battery 20 by the DC-DC converter 30.

In this embodiment, the DC-DC converter 30 is assumed to convert both of the high voltage of the high voltage battery 10 and the low voltage of the low voltage battery 20 thereby to generate the intermediate voltage. A voltage conversion of the DC-DC converter 30 is controlled by the power supply control apparatus 100.

The high voltage of the high voltage battery 10 is converted into a three-phase AC voltage by an inverter 40 to be used as a power supply voltage for the MG 50. The low voltage of the low voltage battery 20 is supplied as a power supply voltage for spark ignition plugs, a microcomputer, lights, an audio device and the like. The intermediate voltage is supplied as a power supply voltage for injectors, a drive motor in a power steering system and the like.

In a case of charging the low voltage battery 20 with the high voltage of the high voltage battery 10, the DC-DC converter 30 lowers, that is, steps down, the high voltage to the intermediate voltage, which is between the high voltage and the low voltage, and further lowers the intermediate voltage to the low voltage for charging the low voltage battery 20. That is, the DC-DC converter 30 does not charge the low voltage battery 20 by directly lowering the high voltage to the low voltage. By thus lowering the high voltage first to the intermediate voltage and then further lowering to the low voltage, heat generation of the DC-DC converter 30 is reduced as much as possible.

In addition, the DC-DC converter 30 boosts, that is, steps up, the low voltage of the low voltage battery 20 to the intermediate voltage and further boosts the intermediate voltage to the high voltage to charge the high voltage battery 10. That is, the DC-DC converter 30 is configured to be capable of both lowering and boosting a voltage. The functions of lowering and boosting of a voltage of the DC-DC converter 30 may be realized by a boost type DC-DC converter and a buck type DC-DC converter, respectively, or may be realized by a boost-buck type DC-DC converter, which is capable of both voltage boosting and lowering.

The power supply control apparatus 100 includes a high voltage detection section 110, a high voltage correction section 112, an intermediate voltage detection section 120, an intermediate voltage correction section 122, a low voltage detection section 130 and a low voltage correction section 132.

The high voltage detection section 110 detects a voltage variation amount of the high voltage of the high voltage battery 10. The intermediate voltage detection section 120 detects a voltage variation amount of the intermediate voltage. The low voltage detection section 130 detects a voltage variation amount of the low voltage of the low voltage battery 20.

The high voltage correction section 112 corrects the high voltage based on the variation amount of the high voltage detected by the high voltage detection section 110 by controlling the DC-DC converter 30 so that the high voltage attains its target voltage value.

Further, the high voltage correction section 112 estimates the voltage variation amount of the high voltage based on the voltage variation amount of the intermediate voltage detected by the intermediate voltage detection section 120 and the voltage variation amount of the low voltage detected by the low voltage detection section 130. The high voltage correction section 112 corrects the high voltage based on the estimated voltage variation amount of the high voltage by controlling the DC-DC converter 30 so that the high voltage attains its target voltage value.

Thus the DC-DC converter 30 boosts the low voltage of the low voltage battery 20 to control the voltage applied to the high voltage battery 10. The voltage applied to the high voltage battery 10 may be controlled alternatively by power generation of the MG 50.

The intermediate voltage correction section 122 corrects the intermediate voltage based on the voltage variation amount of the intermediate voltage detected by the intermediate voltage detection section 120 by controlling the DC-DC converter 30 so that the intermediate voltage attains its target voltage value.

Further, the intermediate voltage correction section 122 estimates the voltage variation amount of the intermediate voltage based on the voltage variation amount of the high voltage detected by the high voltage detection section 110 and the voltage variation amount of the low voltage detected by the low voltage detection section 130. The intermediate voltage correction section 122 corrects the intermediate voltage based on the estimated voltage variation amount of the intermediate voltage by controlling the DC-DC converter 30 so that the intermediate voltage attains its target voltage value.

Thus the DC-DC converter 30 is controlled to generate the intermediate voltage by boosting the low voltage of the low voltage battery 20 or lowering the high voltage of the voltage battery 10.

The low voltage correction section 132 corrects the low voltage based on the voltage variation amount of the low voltage detected by the low voltage detection section 130 by controlling the DC-DC converter 30 so that the low voltage the low voltage battery 20 attains its target voltage value.

Further, the low voltage correction section 132 estimates the voltage variation amount of the low voltage based on the voltage variation amount of the high voltage detected by the high voltage detection section 110 and the voltage variation amount of the intermediate voltage detected by the intermediate voltage detection section 120. The low voltage correction section 132 corrects the low voltage based on the estimated voltage variation amount of the low voltage by controlling the DC-DC converter 30 so that the low voltage attains its target voltage value.

Thus the DC-DC converter 30 is controlled to generate the low voltage supplied to the low voltage battery 20 by lowering the high voltage of the high voltage battery 10.

Power Supply Control Processing

Figure 2:
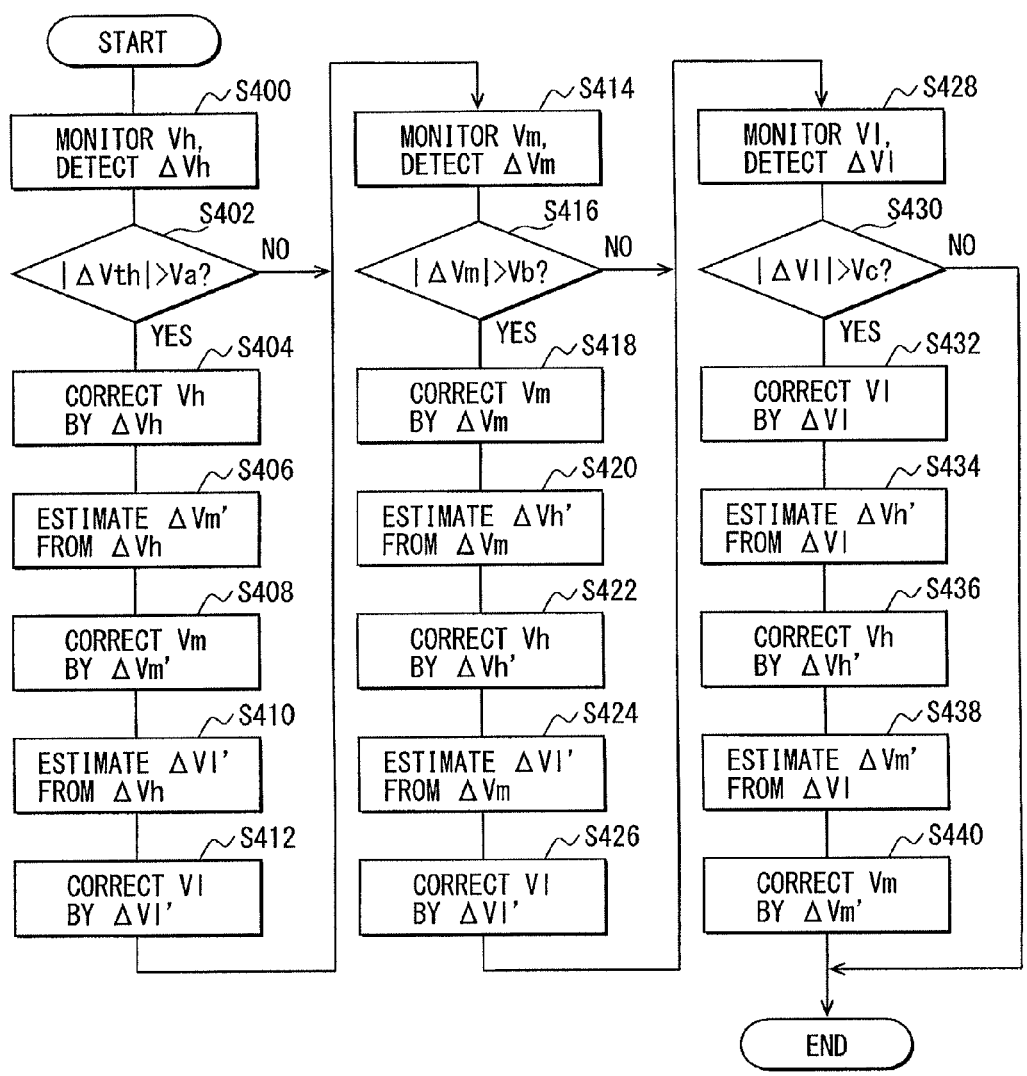
FIG. 2 is a flowchart showing power supply control processing executed by the power control apparatus shown in FIG. 1.

Power supply control processing executed by the power supply control apparatus 100 will be described with reference to a flowchart shown in FIG. 2. This processing of FIG. 2 is executed by, for example, a microcomputer (not shown) which is programmed to operate as the sections 110, 112, 120, 122, 130 and 132, at a predetermined time interval in response to a timer interrupt or the like. In FIG. 2, "S" indicates a step.

The power supply control apparatus 100 detects or acquires at S400 the voltage variation amount $\Delta Vh$ of the high voltage by monitoring the high voltage Vh of the high voltage battery 10. The power supply control apparatus 100 executes S404 when an absolute value $|\Delta Vh|$ of the voltage variation amount $\Delta Vh$ is determined to be greater than a predetermined variation amount Va at S402 (YES). In this case, the high voltage is a varying voltage, which has a large variation.

The power supply control apparatus 100 executes S414 when the absolute value $|\Delta Vh|$ is determined to be equal to or less than the predetermined variation amount Va at S402 (NO).

The power supply control apparatus 100 controls the DC-DC converter 30 based on the voltage variation amount $\Delta Vh$ so that the high voltage Vh is corrected to attain the target voltage value at S404. The power supply control apparatus 100 calculates and estimates at S406 an estimated voltage variation amount $\Delta Vm'$ of the intermediate voltage Vm based on the voltage variation amount $\Delta Vh$ by using the following equation (1).

$$\Delta Vm' = hm0 \times \Delta Vh + hm1 \quad (1)$$

"hm0" and "hm1" are coefficients, which are correction values for calculating the estimated voltage variation amount $\Delta Vm'$ of the intermediate voltage based on the voltage variation amount $\Delta Vh$ of the high voltage. These coefficients are preset by experimental measurements with respect to the power supply control system 2.

Other coefficients, which are used in the following equations (2) to (6), are also preset by similar experimental measurements with respect to the power supply control system 2. In the equations (1) to (6), it is probable that any one of the coefficients is preset to 0. The coefficients may be variable with surrounding temperature, power consumption amount and the like.

The power supply control apparatus 100 corrects at S408 the intermediate voltage Vm to attain its target voltage value by controlling the DC-DC converter 30 based on the estimated voltage variation amount $\Delta Vm'$ calculated at S406.

The power supply control apparatus 100 further calculates and estimates at S410 the estimated voltage variation amount $\Delta Vl'$ of the low voltage Vl based on the voltage variation amount $\Delta Vh$ by using the following equation (2).

$$\Delta Vl'=hl0\times\Delta Vh+hl1 \quad (2)$$

The power supply control apparatus 100 corrects at S412 the low voltage to attain its target voltage value by controlling the DC-DC converter 30 based on the estimated voltage variation amount $\Delta Vl'$ calculated at S410.

The power supply control apparatus 100 detects or acquires at S414 the voltage variation amount $\Delta Vm$ of the intermediate voltage by monitoring the intermediate voltage Vm generated by the DC-DC converter 30.

The power supply control apparatus 100 executes S418 when an absolute value $|\Delta Vm|$ of the voltage variation amount $\Delta Vm$ is determined to be greater than a predetermined variation amount Vb at S416 (YES), that is, when the intermediate voltage Vm is a varying voltage of large variation. The power supply control apparatus 100 executes S428 when the absolute value $|\Delta Vm|$ is determined to be equal to or less than the predetermined variation amount Vb at S416 (NO).

The power supply control apparatus 100 corrects the intermediate voltage Vm to attain its target voltage value at S418 by controlling the DC-DC converter 30 based on the voltage variation amount $\Delta Vm$. The power supply control apparatus 100 next calculates and estimates at S420 the estimated voltage variation amount $\Delta Vh'$ of the high voltage based on the voltage variation amount $\Delta Vm$ by using the following equation (3).

$$\Delta Vh'=mh0\times\Delta Vm+mh1 \quad (3)$$

The power supply control apparatus 100 corrects at S422 the high voltage Vh to attain its target voltage value by controlling the DC-DC converter 30 based on the estimated voltage variation amount $\Delta Vh'$ calculated at S420.

The power supply control apparatus 100 further calculates and estimates at S424 the estimated voltage variation amount $\Delta Vl'$ of the low voltage Vl based on the voltage variation amount $\Delta Vm$ by using the following equation (4).

$$\Delta Vl'=ml0\times\Delta Vm+ml1 \quad (4)$$

The power supply control apparatus 100 corrects at S426 the low voltage to attain its target voltage value by controlling the DC-DC converter 30 based on the estimated voltage variation amount $\Delta Vl'$ calculated at S424.

The power supply control apparatus 100 detects or acquires at S428 the voltage variation amount $\Delta Vl$ of the low voltage by monitoring the low voltage Vl of the low battery 20. The power supply control apparatus 100 executes S432 when an absolute value $|\Delta Vl|$ of the voltage variation amount $\Delta Vl$ is determined to be greater than a predetermined variation amount Vc at S430 (YES), that is, when the low voltage Vl is a varying voltage of large variation.

The power supply control apparatus 100 finishes this processing when the absolute value $|\Delta Vl|$ is determined to be equal to or less than the predetermined variation amount Vc at S430 (NO).

The power supply control apparatus 100 corrects the low voltage Vl at S432 to attain its target voltage value by controlling the DC-DC converter 30 based on the voltage variation amount $\Delta Vl$. The power supply control apparatus 100 further calculates and estimates at S434 the estimated voltage variation amount $\Delta Vh'$ of the high voltage based on the voltage variation amount $\Delta Vl$ by using the following equation (5).

$$\Delta Vh'=lm0\times\Delta Vl+lh1 \quad (5)$$

The power supply control apparatus 100 corrects at S436 the high voltage to attain its target voltage value by controlling the DC-DC converter 30 based on the estimated voltage variation amount $\Delta Vh'$ calculated at S434.

The power supply control apparatus 100 further calculates and estimates at S438 the estimated voltage variation amount $\Delta Vm'$ of the intermediate voltage Vm based on the voltage variation amount $\Delta Vl$ by using the following equation (6).

$$\Delta Vm'=lm0\times\Delta Vl+lm1 \quad (6)$$

The power supply control apparatus 100 corrects at S440 the intermediate voltage to attain its target voltage value by controlling the DC-DC converter 30 based on the estimated voltage variation amount $\Delta Vm'$ calculated at S438.

According to the embodiment described above, the voltage variation amounts of all of the high voltage, the intermediate voltage and the low voltage are detected, and the voltage variation amounts of two voltages other than the varying voltage (voltage of large variation) are estimated. The DC-DC converter 30 is controlled based on the voltage variation amount of the varying voltage and the estimated voltage variation amounts of two other voltages, respectively, so that the varying voltage and two other voltages attain respective target voltage values.

The voltages are thus corrected appropriately based on the voltage variation amounts of the high voltage, the intermediate voltage and the low voltage, which are related one another, respectively, the high voltage, the intermediate voltage and the low voltage are controlled accurately to the respective target voltage values. As a result, by controlling accurately the intermediate voltage for driving the injectors and the low voltage for driving the spark ignition plugs to the respective target voltage values, fuel injection timing of the injectors and ignition timing of the spark ignition plugs can be suppressed from deviating from the respective target timings.

Other Embodiments

In the embodiment, the voltage variation amounts of the high voltage, the intermediate voltage and the low voltage are detected, and the varying voltage of large variation and two voltages other than the varying voltage are corrected based on the voltage variation amounts.

Alternatively, at least one of the voltage variation amounts of the high voltage, the intermediate voltage and the low voltage may be detected, and the varying voltage of large variation and either one of two voltages other than the varying voltage may be corrected based on the detected voltage variation amount.

In the embodiment, the high voltage battery 10 and the low voltage battery 20 are arranged to charge each other. Alternatively, only the low voltage battery 20 may be charged by lowering the high voltage of the high voltage battery 10. In this case, the high voltage of the high voltage battery 10 is corrected by controlling the electric power, which the MG 50 generates by way of regenerative braking.

In the case that the high voltage battery 10 and the low voltage battery 20 charge each other, the DC-DC converter may perform voltage conversion to generate directly the charge voltage without using the intermediate voltage.

In the embodiment, the hybrid vehicle is assumed to be a parallel-type, which uses both the internal combustion engine and the MG 50 as the drive power source for vehicle travel. Alternatively, in a case that the high voltage battery and the low voltage battery are provided and at least either one of the high voltage of the high voltage battery and the low voltage of the low voltage battery is converted to the intermediate voltage, the power supply control apparatus according to the present embodiment may be used for any vehicles such as a series-type hybrid vehicle, which uses the internal combustion engine only for electric power generation and the MG for vehicle travel, a plug-in hybrid vehicle or an electric vehicle.

As described above, the power supply control apparatus is not limited to the above-described embodiment but may be implemented in various embodiments.

What is claimed is:

1. A power supply control apparatus for a vehicular power supply system, which has a high voltage power supply device of a high voltage, a low voltage power supply device of a low voltage lower than the high voltage and a converter for power conversion, charges the low voltage power supply device by lowering the high voltage and generates an intermediate voltage between the high voltage and the low voltage by converting at least one of the high voltage and the low voltage by the converter, the power supply control apparatus comprising:
   a variation amount acquisition section for acquiring a voltage variation amount of at least one of the high voltage, the intermediate voltage and the low voltage; and
   a correction section for correcting a varying voltage, which is one of the high voltage, the intermediate voltage and the low voltage having an acquired voltage variation amount, and at least one of two voltages other than the varying voltage, by controlling the converter based on the voltage variation amount of the varying voltage.

2. The power supply control apparatus according to claim 1, wherein:
   the variation amount acquisition section acquires the voltage variation amount of the high voltage; and
   the correction section corrects the high voltage, the intermediate voltage and the low voltage based on the voltage variation amount of the high voltage acquired by the variation amount acquisition section.

3. The power supply control apparatus according to claim 1, wherein:
   the variation amount acquisition section acquires the voltage variation amount of the intermediate voltage or the low voltage; and
   the correction section corrects the varying voltage and the high voltage based on the voltage variation amount of the intermediate voltage or the low voltage acquired by the variation amount acquisition section.

4. The power supply control apparatus according to claim 1, wherein:
   the variation amount acquisition section acquires the voltage variation amounts of all of the high voltage, the intermediate voltage and the low voltage; and
   the correction section corrects the varying voltage and the other two voltages based on the voltage variation amounts of the high voltage, the intermediate voltage and the low voltage acquired by the variation amount acquisition section.

5. The power supply control apparatus according to claim 1, wherein:
   the correction section includes an estimation section for estimating the voltage variation amount of the other voltage other than the varying voltage by multiplying the voltage variation amount acquired by the variation amount acquisition section by a predetermined correction value; and
   the correction section corrects the other voltage based on an estimated voltage variation amount estimated by the estimation section.

6. The power supply control apparatus according to claim 1, wherein:
   the correction section includes an estimation section for estimating the voltage variation amount of the other voltage other than the varying voltage by adding a predetermined correction value to the voltage variation amount acquired by the variation amount acquisition section; and
   the correction section corrects the other voltage based on an estimated voltage variation amount estimated by the estimation section.

7. The power supply control apparatus according to claim 1, wherein:
   the correction section includes an estimation section for estimating the voltage variation amount of the other voltage other than the varying voltage by multiplying the voltage variation amount acquired by the variation amount acquisition section by a predetermined first correction value and by adding a predetermined second correction value to the voltage variation amount; and
   the correction section corrects the other voltage based on an estimated voltage variation amount estimated by the estimation section.

8. The power supply control apparatus according to claim 1, wherein:
   the correction section performs correction of the varying voltage and the other voltage only when the voltage variation amount acquired by the variation amount acquisition section is greater than a predetermined variation amount.

* * * * *